(12) United States Patent
Chen et al.

(10) Patent No.: US 9,123,103 B2
(45) Date of Patent: Sep. 1, 2015

(54) METHOD AND APPARATUS FOR IMAGE DENOISING WITH THREE-DIMENSIONAL BLOCK-MATCHING

(71) Applicant: MEDIATEK INC., Hsin-Chu (TW)

(72) Inventors: Ding-Yun Chen, Taipei (TW); Chi-Cheng Ju, Hsinchu (TW); Cheng-Tsai Ho, Taichung (TW)

(73) Assignee: MEDIATEK INC., Science-Based Industrial Park, Hsinchu (TW)

( * ) Notice: Subject to any disclaimer, the term of this patent is extended or adjusted under 35 U.S.C. 154(b) by 89 days.

(21) Appl. No.: 14/141,416

(22) Filed: Dec. 26, 2013

(65) Prior Publication Data

US 2015/0187053 A1 Jul. 2, 2015

(51) Int. Cl.
*G06K 9/40* (2006.01)
*G06T 5/00* (2006.01)
*G06T 5/10* (2006.01)
*G06T 5/20* (2006.01)

(52) U.S. Cl.
CPC . *G06T 5/002* (2013.01); *G06T 5/10* (2013.01); *G06T 5/20* (2013.01); *G06T 2207/10004* (2013.01); *G06T 2207/20024* (2013.01); *G06T 2207/20052* (2013.01); *G06T 2207/20182* (2013.01)

(58) Field of Classification Search
CPC ..... H04N 19/117; H04N 19/61; H04N 19/90; H04N 19/154; H04N 19/192; H04N 19/48; H04N 19/527; H04N 19/577; H04N 19/59; H04N 19/85; H04N 19/86; H04N 19/126; H04N 19/136; H04N 19/176; H04N 19/503; H04N 19/80; G06T 3/40
USPC .......................................... 382/264
See application file for complete search history.

(56) References Cited

U.S. PATENT DOCUMENTS

| 5,729,631 | A  | * | 3/1998  | Wober et al. ................... 382/232 |
| 6,553,127 | B1 | * | 4/2003  | Kurowski ....................... 382/100 |
| 2003/0016884 | A1 | * | 1/2003  | Altunbasak et al. ........... 382/299 |
| 2004/0228406 | A1 | * | 11/2004 | Song ......................... 375/240.04 |
| 2010/0309985 | A1 | * | 12/2010 | Liu et al. .................... 375/240.25 |
| 2013/0235931 | A1 | * | 9/2013  | Su et al. ..................... 375/240.12 |

* cited by examiner

*Primary Examiner* — Ali Bayat
(74) *Attorney, Agent, or Firm* — Winston Hsu; Scott Margo

(57) ABSTRACT

A method for denoising images by block-matching three-dimensional (BM3D) method is disclosed in the present invention. Embodiments of the present invention are used to improve the quality of captured images. Instead of using the same noise variance to denoise all patches of an image, each patch is processed based on a particular assessed noise variance. The assessed noise variance of one reference patch is determined based on noise variance associated with the patch set or based on content characteristics associated with the patch set. The patch set is obtained by block-matching to find similar patches of the reference patch. Noise reduction in frequency domain is applied to the patch set according to the assessed noise variance of the reference patch. The determining of the assessed noise variance can be performed in spatial domain or in frequency domain.

22 Claims, 7 Drawing Sheets

METHOD AND APPARATUS FOR IMAGE DENOISING WITH THREE-DIMENSIONAL BLOCK-MATCHING

FIELD OF THE INVENTION

The present invention relates to image processing. In particular, the present invention relates to method of denoising images with three-dimensional block-matching.

BACKGROUND AND RELATED ART

Images captured by camera or other video and image systems usually contain noise introduced by analog devices or during conversion from analog signal to digital signal. Noise can be a particularly significant problem in low light conditions. Thus image denoising technologies have been developed to improve signal quality of captured images. Depending on the data being used, image denoising methods can be divided into spatial denoising methods which use intra-frame information only, temporal denoising methods that employ inter-frame information and motion compensation, and methods that combine both intra-frame and inter-frame information for denoising.

BM3D (block-matching three-dimensional) method is developed to perform image denoising. By block-matching (BM), similar 2D (two-dimensional) patches of each 2D reference patch are identified for denoising purpose. The similar 2D patches are selected from the still image or the video frame containing the reference patch by spatial denoising methods. For temporal denoising methods, the similar patches can also be found from a sequence of digital video frames. The reference patch and the matched patches can be grouped as a patch set according to the similarity of the grouped patches. The patch set is then transformed and denoised. The weighted average of the reference patch and its similar patches (which are also called matched patches) can be used to reduce noise of the all pixels of the reference patch.

FIG. 1 illustrates an example of image analysis by BM to identify similar patches and group the patches into patch sets, each of which can be represented as a 3D data array. As shown by FIG. 1, one noisy image is processed by BM and each processed patch and the similar patches are grouped into 3D arrays. Each processed patch by BM is also treated as a reference patch. Reference patch R10 and the matched patches M11 and M12 can be grouped to form 3D data array 110. Reference patch R20 has four matched patches M21, M22, M23 and M24 with similar image content. These five patches are stacked into 3D data array 120. Patch R30 and the matched patches M31, M32 and M33 are grouped into 3D data array 130. Patch R40 together with its matched patch M41, M42 and M43 are grouped into 3D data array 140. In each 3D data array, the correlation between the patches of each 3D array can be employed to improve performance of image processing.

Based on the denoised result using block-matching, the noise of an image is attenuated in transform domain. FIG. 2 illustrates an exemplary flow chart of image denoising by a BM3D method. The denoising on noisy image 210 is performed by two denoising processes. The first is denoising process 220 which performs image denoising by hard-thresholding and the second is process 230 which performs image denoising by empirical Wiener filtering. In process 220, grouping by block-matching is performed on noisy image 210 to search for similar patches of the current patch by process 221. The current patch of original noisy image is used as a reference patch referred to as R1. Reference patch R1 together with its similar patches is grouped into one 3D data array by process 222. Then the 3D data array is processed by transform-domain shrinkage which starts from 3D transform 223. The 3D transform corresponds to a unitary transform which can be implemented as 2D discrete cosine transform (DCT) followed by 1D Hadamard transform. The similarity or correlation between the patches in the 3D array is exploited by applying the 3D unitary transform to produce a sparse representation of the true signal in 3D transform domain. Then the noise is attenuated by hard-thresholding 224 on the transform coefficients in 3D domain and the corresponding weight is obtained. Inverse 3D transform 225 following hard-thresholding 224 is performed to produce estimates of all the patches. All patches of the noisy image are processed in a sliding manner to yield block-wise estimates of all the patches. The overlapping block-wise estimates for each reference block forms a redundant estimate of the true signal. In order to get a non-redundant estimate of the noisy image, aggregation 226 is performed on the block-wise estimates and the weight produced by hard-thresholding 224. The basic estimate of the noisy image is obtained by aggregation 226 in denoising step 220.

The basic estimate (i.e. weighted average of all patches) of the noisy image is used by the second denoising process. Instead of using hard-thresholding, Wiener filtering is used to reduce noise in denoising process 230. The basic estimate of R1 is identified as reference patch R2. Grouping by block-matching 231 is performed within the basic estimate rather than within noisy image 210 to find similar patches of reference patch R2. R2 and the similar patches are stacked together to form one 3D data array by processing 232. The 3D data is processed by 3D transform 233 including 2D DCT and 1D Hadamard transform. The transform coefficients are processed by Wiener filtering 234 to attenuate the noise in transform domain and produce weight of each patch. Then 3D inverse transform 235 is performed to yield estimates for all patches. All the patches of the image are processed in a sliding manner to generate block-wise estimates. The final Wiener estimate is computed by aggregation 236 which is based on the weight obtained from Wiener filtering 234 and the block-wise estimates output by inverse 3D transform 235.

During image denoising in BM3D processing by hard-thresholding such as process 220 shown in FIG. 2, noise variance is utilized on the shrinkage of transform coefficients to realize denoising.

FIG. 3 illustrates an exemplary flow of denoising by hard-thresholding in 3D transform domain with block-matching. Noise variance is estimated based on input noisy image. As shown by FIG. 3, noisy image 310 is processed first to estimate variance $\sigma^2$ by variance estimation 311. Based on the estimation result, the standard deviation $\sigma$ is computed in process 312. The standard deviation $\sigma$ can be output to block-matching process 320 and denoising process 330 which shrinks transform coefficients by hard-thresholding. Block-matching is performed on noisy image 310 to yield the block-matching result $S_{\chi R}$. The block-matching result $S_{\chi R}$ contains the coordinates of the matched patches that are similar to the reference patch referred as R. The block-matching result and the standard deviation $\sigma$ are used by denoising process 330 to perform denoising by hard-thresholding in 3D transform domain.

Based on the result of block-matching, each reference patch and the matched patches are grouped to form 3D data array $Z_{S_{\chi R}}$. The denoising process by hard-thresholding in 3D transform domain is performed on 3D array $Z_{S_{\chi R}}$. The denoising process in 3D transform domain comprises three steps which are 3D transform, hard-thresholding and inverse 3D transform. The 3D transform produces a spares representation of the true signal in transform domain based on the similarity among the grouped patches. By hard-thresholding the transform coefficients, corresponding weight of each grouped patches is produced and the noise of grouped patches is attenuated according to the value of standard deviation $\sigma$. Inverse 3D transform follows hard-thresholding to reconstruct estimate of each patch. Denoising in 3D transform domain 332 outputs weight $\psi_{S_{\chi R}}$ and 3D array $\hat{Y}_{S_{\chi R}}$ of reconstructed patch estimates. Kaiser window $W_{win2D}$ is multiplied to weight $\omega_{S_{\chi R}}$ to yield one patch of weights $W(\chi R)$ by multiplying process 341. The summations in the denominator, which are represented by wbuff; are accumulated to the weights buffer by process 343. By using Kaiser Window $W_{win2D}$, the impact of artifacts on the borders of patches (border effects) can be reduced. Another multiplying process 342 is used to multiply the patch of weights $W(\chi R)$ to the estimate of each reconstructed patch. The results of multiplying process 342 are accumulated to estimate buffer by process 344. The summations in the numerator are represented by "ebuff". Process 345 is used to compute the intermediate estimate or basic estimate of the noisy image by dividing ebuff by wbuff. The intermediate estimate is used as basic estimate for denoising process by Wiener filtering.

In hard-thresholding of traditional BM3D methods, several related arts estimate the image noise variance of the input noisy image for denoising and other related arts assume the noise variance of input image is known. The noise variance may be defined on the input image or on a transform domain. However, all these denoising methods in traditional methods share the same shortcoming that the same noise variance is applied to the whole image regardless of how the noise variance is determined. For example, the same noise variance is used to reduce noise on all patches of the input image. Another example is to transfer the input image into a new image domain such as frequency domain. Then, the BM3D method is performed to the new image domain and utilizes the same noise variance to process all the patches of the input image. The same variance is used in the denoising process for the whole image in either temporal domain or a transform domain.

In reality, noise level varies even in the same input image due to the fluctuation of signal strength. Using the same noise variance level for denoising the whole image will apparently have problems when the actual noise variance in a patch deviates from the given noise variance. The result of denoising based on same noise variance that is far off the actual value will cause the denoised area to become more blurred. This problem motivates the current invention.

BRIEF SUMMARY OF THE INVENTION

Methods and apparatus for image noise reduction are disclosed in the present invention. According to one embodiment of the present invention, the method comprises receiving a noisy image with a first size; selecting one reference patch with a second size from the noisy image, wherein the second size is smaller than the first size; determining assessed noise variance associated with a patch set; transforming the patch set into frequency domain before, in parallel with or after said determining the assessed noise variance; applying noise reduction to the patch set in the frequency domain according to the assessed noise variance; and inverse transforming the patch set back to spatial domain to obtain one processed reference patch of the noisy image. The patch set consists of the reference patch, similar patches exhibiting high similarity to the reference patch, or both the reference patch and the similar patches. The assessed noise variance is derived based on first noise variance associated with the patch set or based on content characteristics of the patch set. The method may further comprise aggregating all processed reference patches of the noisy image.

The determining of the assessed noise variance may be performed in spatial domain or in frequency domain. The assessed noise variance may correspond to the noise variance of the reference patch or the noise variance of the patch set. The assessed noise variance may be derived by analyzing the content characteristics of the patch set to obtain analyzing result. The content characteristics of the patch set may correspond to pixels in or near each patch of the patch set. The content characteristics of the patch set may also correspond to at least one of contrast, lightness, saturation and hue. The content characteristics of the patch set can be a frequency band as well. The assessed noise variance can be mapped to the analyzing result of the content characteristics linearly or non-linearly.

The reference patch may be in YUV domain or Bayer pattern domain. The transform of the patch set can be performed by three-dimensional transform, two-dimensional transform or one-dimensional transform. The three-dimensional transform corresponds to two-dimensional discrete cosine transform and one-dimensional Hadamard transform. The noise reduction may be performed by modifying one or more frequency coefficients of the patch set according to the first noise variance. Hard-thresholding or Wiener filtering may be used to perform the noise reduction.

According to another embodiment of the present invention, the assessed noise variance of the reference patch is determined based on one or more frequency coefficients. The method comprises receiving a noisy image with a first size; selecting one reference patch with a second size from the noisy image, wherein the second size is smaller than the first size; transforming the reference patch from spatial domain into frequency domain to obtain frequency coefficients of the reference patch; determining assessed noise variance of the reference patch according to at least one of the frequency coefficients; modifying said at least one of the frequency coefficients for noise reduction according to the assessed noise variance; and inverse transforming the reference patch back to spatial domain to obtain one processed reference patch of the noisy image. The assessed noise variance is derived based on noise variance associated with the reference patch or based on content characteristics of the reference patch. The assessed noise variance can be used for noise reduction on said similar patches of the reference patch. The method may further comprise applying aggregation on the processed reference patch. The reference patch may be in YUV domain or Bayer pattern domain.

The transformation of the reference patch can be performed by three-dimensional transform, two-dimensional transform or one-dimensional transform. The three-dimensional transform corresponds to two-dimensional discrete cosine transform and one-dimensional Hadamard transform.

Apparatus of reducing noise of noisy image are also disclosed in the present invention. According to one embodiment of the present invention, the apparatus comprises one or more electronic circuits. Said one or more electronic circuits are configured to receive a noisy image with a first size; select one reference patch with a second size from the noisy image, wherein the second size is smaller than the first size; determine assessed noise variance for the reference patch associated with a patch set; identify said similar patches and group said similar patches with the reference patch into the patch set; transform the patch set into frequency domain; apply noise reduction to the patch set in the frequency domain according to the assessed noise variance of the reference patch; inverse transform the patch set back to spatial domain to obtain one processed reference patch of the noisy image; and aggregate all processed reference patches of the noisy image. The patch set consists of the reference patch, similar patches exhibiting high similarity to the reference patch, or both the reference patch and the similar patches. The assessed noise variance is derived based on first noise variance associated with the patch set or based on content characteristics of the patch set.

According to another embodiment, the apparatus of reducing noise of noisy image comprises one or more electronic circuits. Said one or more electronic circuit are configured to receive a noisy image with a first size; select one reference patch with a second size from the noisy image, wherein the second size is smaller than the first size; transform the reference patch into frequency coefficients; determine assessed noise variance for the reference patch according to at least one of the frequency coefficients; modify said at least one of the frequency coefficients for noise reduction according to the assessed noise variance; inverse transform the reference patch back to spatial domain; and apply aggregation on the processed reference patch. The assessed noise variance is derived based on noise variance associated with the reference patch or based on content characteristics of the reference patch.

DETAILED DESCRIPTION OF THE INVENTION

In order to improve the quality of image denoising, different noise variance values are used for different area of the whole noisy image according to the present invention. The area can be a patch or a patch set which is smaller than the whole noisy image. Therefore, two or more noise variance values are used for the whole noisy image. Each noise variance value to be used for applying noise reduction on one patch or one patch set is called an assessed noise variance in the present invention. Traditional denoising methods use a same noise variance value throughout the whole image when the actual noise variance fluctuates within the input image. In present invention, a dynamic approach is used to determine different assessed noise variances for different area will outperform traditional denoising methods. Thus present invention may result in better denoised image quality.

According to the present invention, each patch is processed with a particular assessed noise variance determined based on data of the patch. The noise variance determination is associated with a patch set which consists of one reference patch and similar patches exhibiting high similarity of the reference patch. The reference patch can be any patch to be processed in the noisy image. The assessed noise variance of reference patch can be determined based on the reference patch only or on the patch set.

If the noise variance determination is based on the reference patch only, the assessed noise variance is the value of conventional noise variance or derived from the result of analyzing content characteristics of the reference patch. To determine the assessed noise variance of the reference patch by analyzing content characteristics of the reference patch, the content characteristics of the patch are analyzed first to obtain a patch metric index. Then the assessed noise variance of the reference patch is computed based on the patch metric index.

If the noise variance determination is based on the patch set, all the patches of a patch set can share one assessed noise variance. Therefore, only one assessed noise variance is used for noise reduction on each patch in the patch set. The assessed noise variance used for processing the reference patch can be the average noise variance determined based on the data of the patch set.

Figure 1:
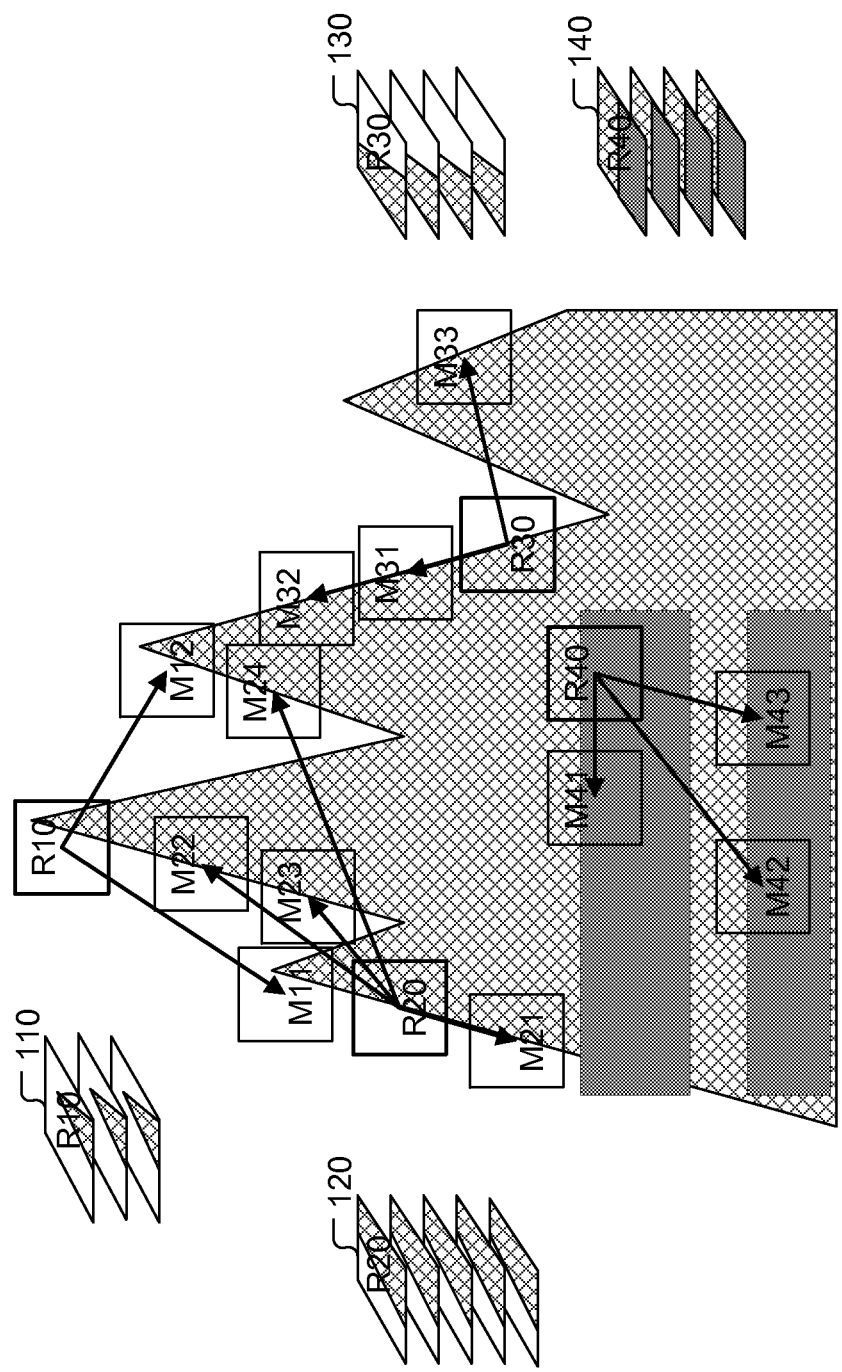
FIG. 1 illustrates an example of noisy image analysis by block-matching.
Figure 2:
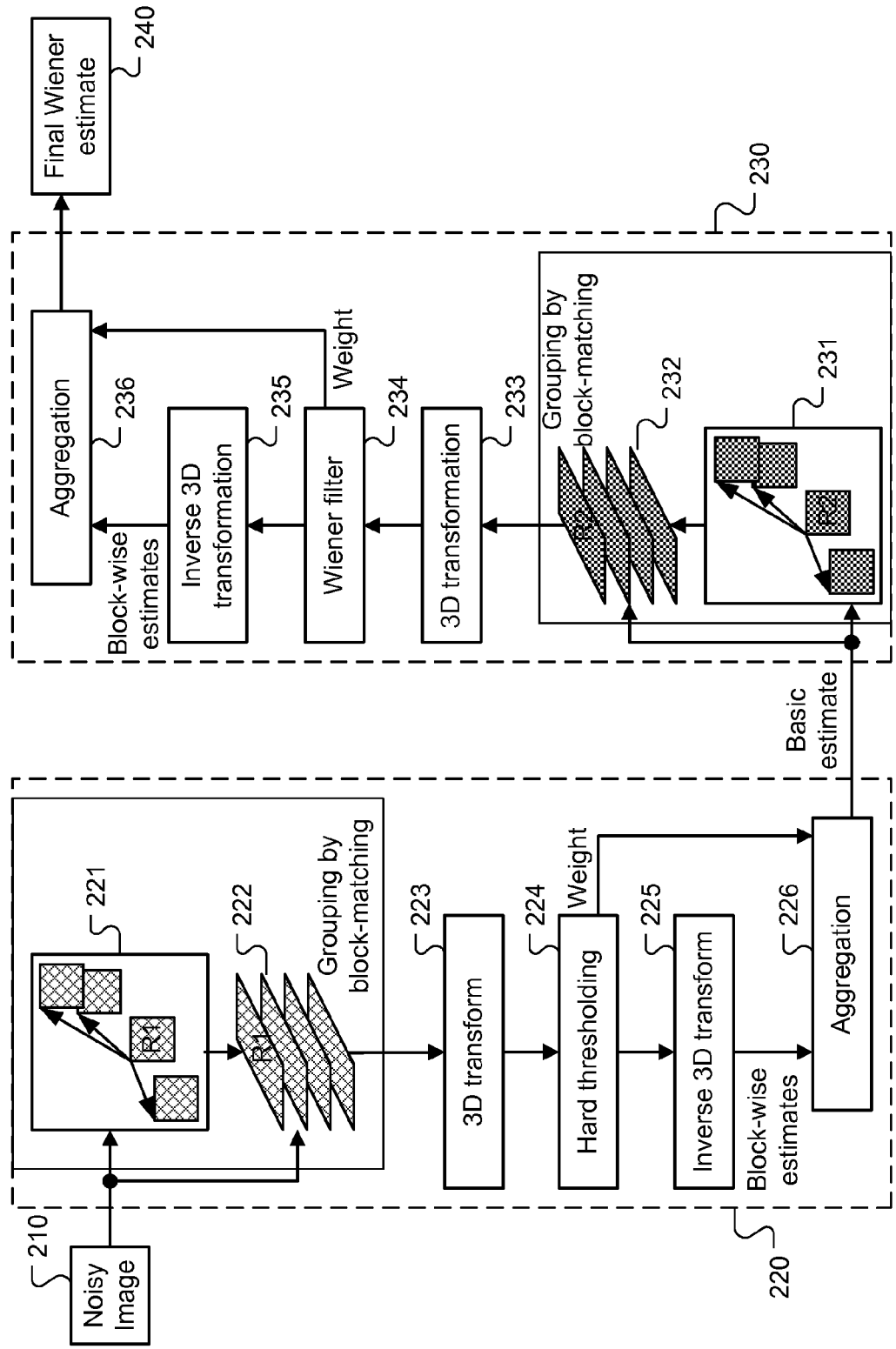
FIG. 2 illustrates an exemplary flow chart of image denoising by a BM3D.
Figure 3:
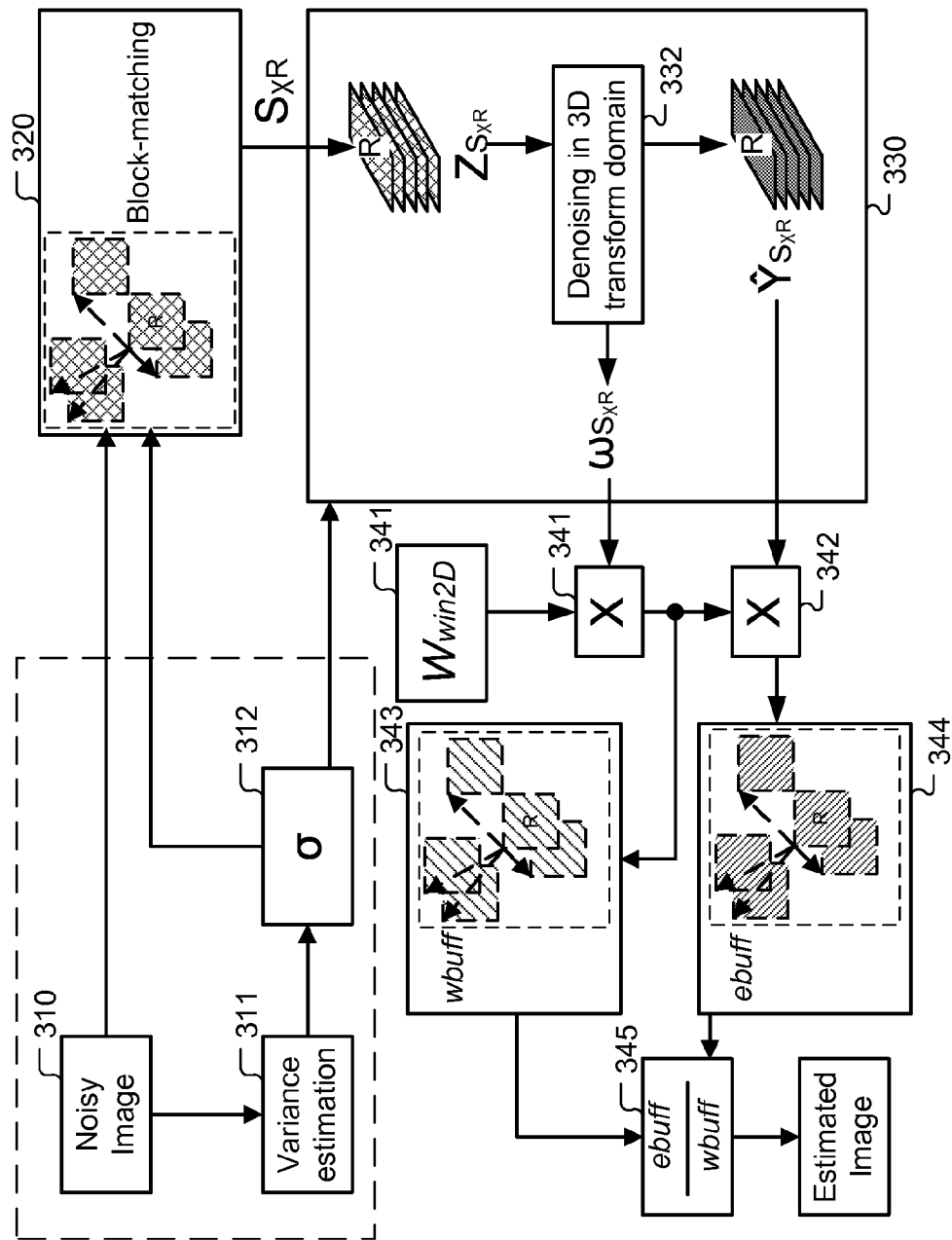
FIG. 3 illustrates an exemplary flow chart of image denoising by hard-thresholding in 3D transform domain with block-matching.
Figure 4:
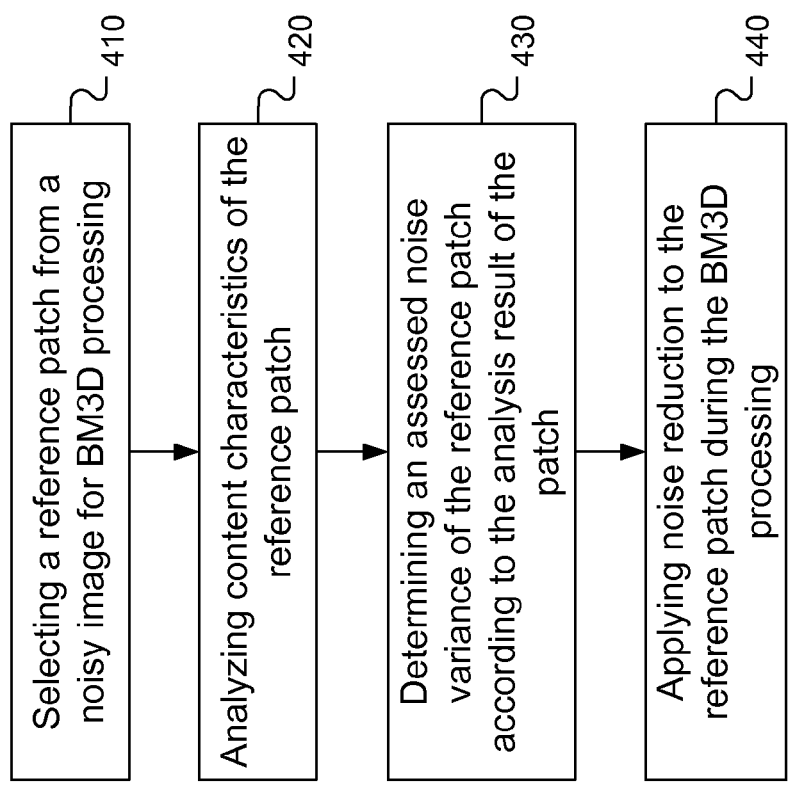
FIG. 4 illustrates an exemplary flow chart of image denoising method according to one embodiment of the present invention.

FIG. 4 illustrates an exemplary flow chart of image denoising by BM3D method according to the present invention. In this embodiment, the assessed noise variance used for processing the reference patch is determined based on image analyzing of the reference patch. For denoising, the noisy image is processed by overlapping partition or non-overlapping partition to obtain patches. The size of each reference patch is smaller than the size of the noisy image. As shown in FIG. 4, a reference patch is selected first from a noisy image in step 410. The reference patch can be in YUV (i.e. luminance/chrominance) domain, Bayer pattern domain or other color space domain. The content characteristics of the reference patch are analyzed to yield a patch metric index in step 420. The analysis on image content of the reference patch can be in spatial domain or in frequency domain. The noise variance to be used for noise reduction on the reference patch is determined according to the patch index in step 430. The noise variance can be mapped to the patch metric index linearly or non-linearly. After the assessed noise variance for the reference patch is determined, the assessed noise variance is applied to the BM3D processing for the reference patch in step 440.

The noise of the image may be noticed by human vision especially at low light condition. Therefore, the determination of the assessed noise variance may take into account of the human visual effect. Thus, the content characteristics to be analyzed in step 420 can be at least one of the contrast, lightness, intensity, saturation and hue of the reference patch, or other content characteristics. The analysis can be also based on the frequency band. To determine the assessed noise variance based on the reference patch, the pixels in the reference patch or near the reference patch can be used for image content analysis.

The BM3D processing in step 440 includes the processes of grouping by block-matching, 3D transform, modification of transform coefficients, inverse 3D transform and aggregation. During BM3D processing, the reference patch is processed by block-matching first to find similar patches and then the reference patch and the similar patches are grouped into one patch set which can be represented as one 3D array. Block-matching is performed in spatial domain or in frequency domain. The algorithm used for block-matching can be the motion estimation fast algorithm. After applying grouping the patch set, the reference patch is transformed to frequency domain. The 3D transform used in BM3D processing can be replaced by 2D or 1D transform, or replaced any of 3D, 2D and 1D transform. After applying noise reduction on the patch set including the reference patch, inverse 3D or 2D or 1D transform is applied to transform the patch set back to spatial domain and one processed reference patch or processed patches of the patch set are obtained. After all the patches of the noisy image are processed by inverse transform, the reconstructed or processed reference patches are processed by aggregation to produce the estimate of the noisy image.

As the assessed noise variance is determined based on the data of the reference patch only, the determination of the assessed noise variance can be performed in any position of BM3D processing before noise reduction and inverse transform. The determination of the assessed noise variance can be performed before, in parallel or after block-matching, transformation or both. Similarly, the analyzing on the content characteristics can also be performed before, in parallel or after block-matching, transformation or both.

Figure 5:
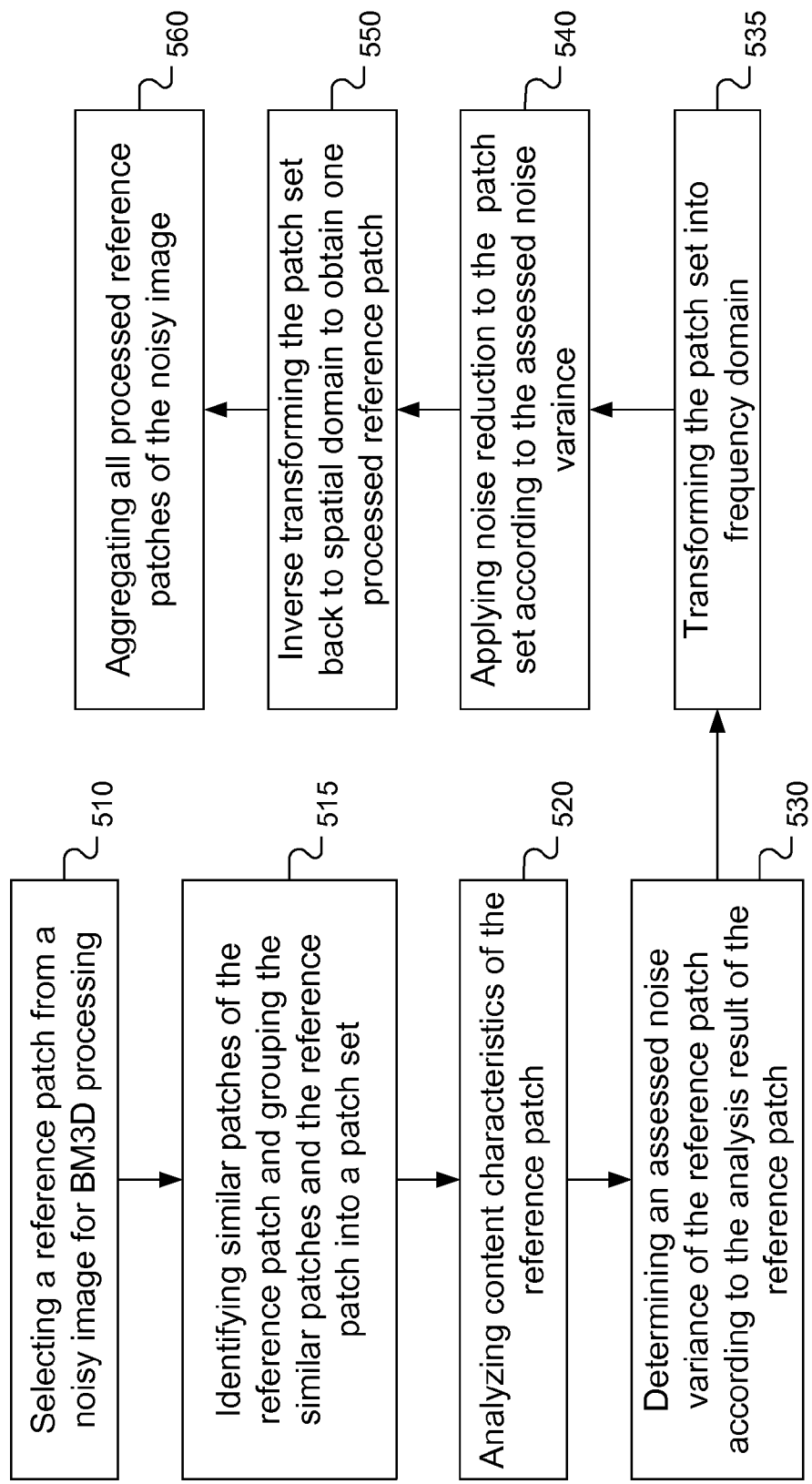
FIG. 5 illustrates an exemplary flow chart of image denoising method with BM3D processing according to one embodiment of the present invention.

FIG. 5 illustrates an exemplary flow chart of image denoising with BM3D processing according to the present invention. In this example shown in FIG. 5, the analyzing process in step 520 and the determining process in step 530 are performed between block-matching 515 and transforming 535. The assessed noise variance can be determined based on the reference patch or the patch set. The noise reduction is applied by hard-thresholding or other process according to the assessed noise variance of the reference patch in step 540. When the noise reduction is performed by hard-thresholding to modify one or more coefficients according to the assessed noise variance of the reference patch, weight of the reference patch is obtained. The weight can be used by aggregation in step 560 to produce estimate of the noisy image.

Figure 6:
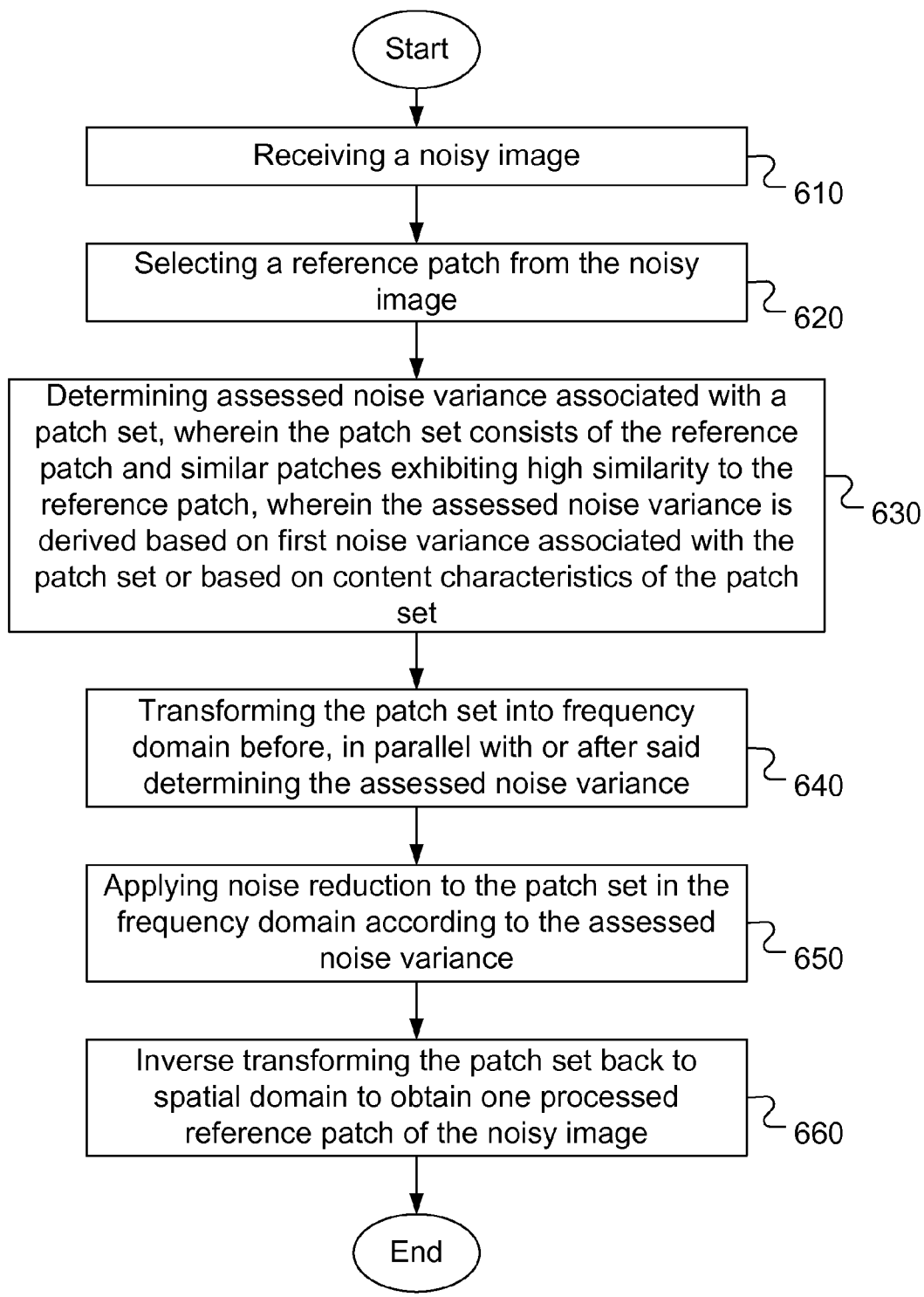
FIG. 6 illustrates an exemplary flow chart of image denoising on each patch according to one embodiment of the present invention.

FIG. 6 illustrates an exemplary flow chart of noise reduction on one reference patch of a noisy image according to one embodiment of the present invention wherein the noise determination is performed before or in parallel with transform. The noisy image is received in step 610 and the reference patch is selected from the noisy image in step 620. The reference patch may be obtained by either overlapped partitioning or non-overlapped partitioning the noisy image. The size of the reference patch is smaller than that of the noisy image. The reference patch may be in YUV domain or Bayer pattern domain.

The assessed noise variance of the reference patch is determined associated with a patch set in step 630. The patch set consists of the reference patch and similar patches exhibiting high similarity to the reference patch. The assessed noise variance is derived based on the noise variance associated with the patch set or based on content characteristics of the patch set. When it is based on the noise variance associated with the patch set, the assessed noise variance is the conventional noise variance of the reference patch or the average value of conventional noise variances of all patches in the patch set. When it is derived based on the content characteristics associated with the patch set, the assessed noise variance can be determined according to the reference patch only or all patches in the patch set.

The content characteristics associated with the patch set are analyzed to yield a patch metric index which is used for determination the assessed noise variance of the reference patch. The content characteristics may correspond to at least one of contrast, lightness, saturation, hue or their combination. The content characteristics may correspond to a frequency band of the reference patch. The assessed noise variance of the reference patch may be mapped to the patch metric index linearly or non-linearly. The patch metric index may correspond to one or more statistic values in spatial domain. The determination may be according to at least one statistic value in spatial domain.

The patch set is transformed to frequency domain in step 640 which can also be performed before or in parallel with determination the assessed noise variance. The reference patch can be transformed by three dimensional, two dimensional, or one dimensional transformation, or combination of those. Noise reduction is applied to the patch set according to the assessed noise variance in step 650. The patch set is inverse transformed back to spatial domain in step 660 to obtain a processed reference patch of the noisy image. All the processed reference patches of the noisy image can be processed by aggregation to yield estimate of the noisy image. The method may further comprise finding similar patches of the reference patch by block-matching which can be performed before, in parallel with or after determining the assessed noise variance in spatial domain or in frequency domain.

Figure 7:
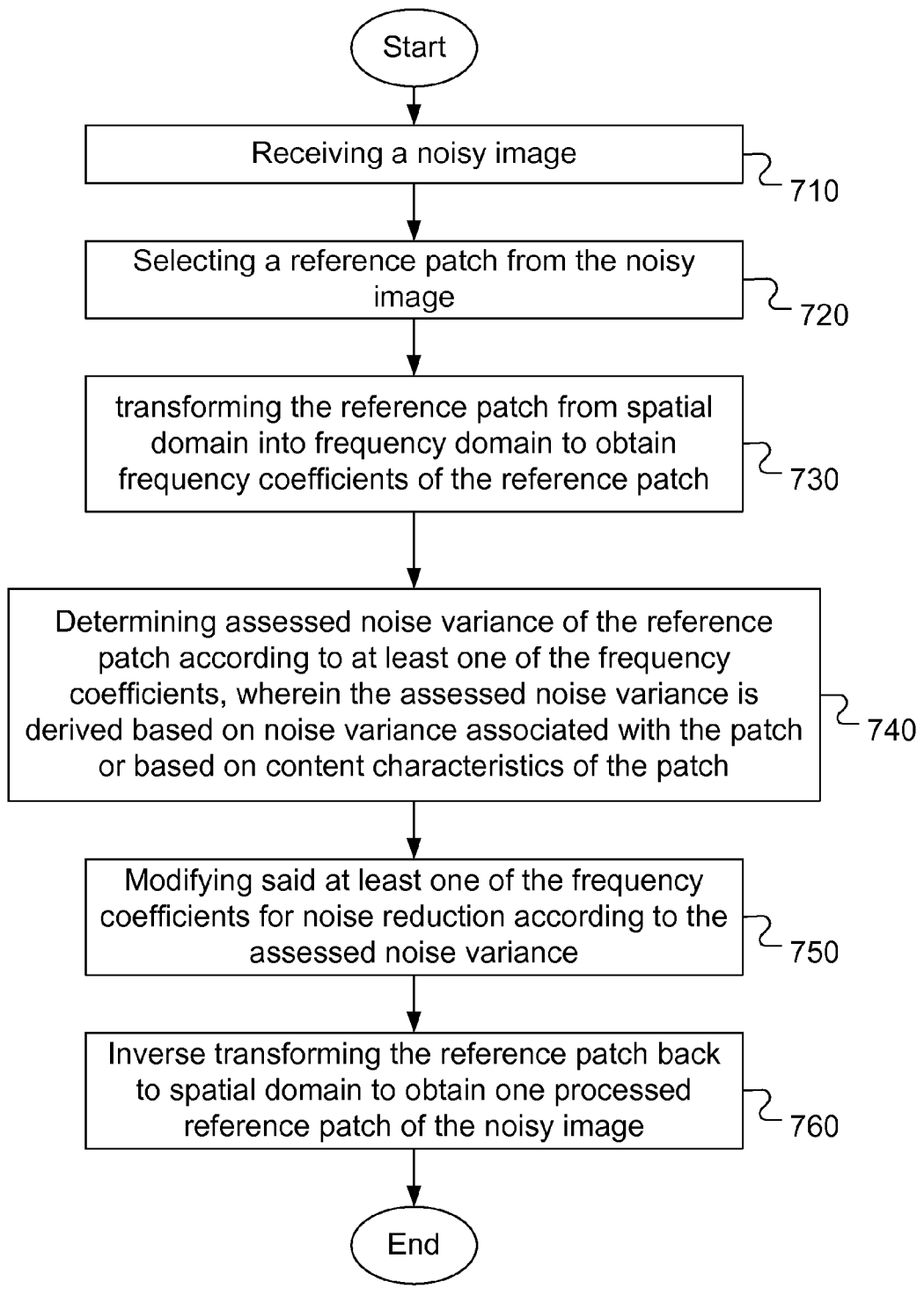
FIG. 7 illustrates an exemplary flow chart of image denoising in frequency domain according to one embodiment of the present invention.

FIG. 7 illustrates another exemplary flow chart of noise reduction on one reference patch of a noisy image according to one embodiment of the present invention. In this embodiment, the determination of the assessed noised variance is performed after transformation. A noisy image is received first in step 710. One reference patch is selected in step 720 from a noisy image which may be processed by either overlapped partitioning or non-overlapped partitioning. The reference patch in YUV domain or Bayer pattern domain is transformed from spatial domain to frequency domain in step 730. The reference patch can be transformed by three dimensional, two dimensional, or one dimensional transformation, or combination of those.

The assessed noise variance of the reference patch is determined in step 740 according to at least one of the frequency coefficients. The assessed noise variance is derived based on noise variance associated with the reference patch or based on content characteristics of the reference patch. The content characteristics may correspond to at least one of contrast, lightness, saturation or hue. The content characteristics may correspond to a frequency band of the reference patch. By analyzing the content characteristics of the reference patch in frequency domain, a patch metric index can be obtained. The assessed noise variance of the reference patch may be mapped to the patch metric index linearly or non-linearly.

After the assessed noise variance is determined, one or more of the transform coefficients are modified for noise reduction performed on the reference patch in step 750. The reference patch is inverse transformed back to spatial domain in step 760 to produce one processed reference patch. The processed reference patch can be used by aggregation to yield estimate of the noisy image. The method may further comprise finding similar patches of the reference patch by block-matching performed in spatial domain or in frequency domain.

Embodiment of the present invention as described above may be implemented in various hardware, software codes, or a combination of both. For example, an embodiment of the present invention can be a circuit integrated into pre-processing unit of a video compression chip or program code integrated into image signal processing software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. An image noise reduction method, the method comprising:
   receiving a noisy image with a first size;
   selecting one reference patch with a second size from the noisy image, wherein the second size is smaller than the first size;
   determining assessed noise variance associated with a patch set, wherein the patch set consists of the reference patch, similar patches exhibiting high similarity to the reference patch, or both the reference patch and the similar patches, and wherein the assessed noise variance is derived based on noise variance associated with the patch set or based on content characteristics associated with the patch set;
   transforming the patch set into frequency domain before, in parallel with or after said determining the assessed noise variance;
   applying noise reduction to the patch set in the frequency domain according to the assessed noise variance; and
   inverse transforming the patch set back to spatial domain to obtain one processed reference patch of the noisy image.

2. The method of claim 1, wherein said determining the assessed noise variance is performed in spatial domain or in frequency domain.

3. The method of claim 1, wherein the assessed noise variance corresponds to the noise variance of the reference patch or the noise variance of the patch set.

4. The method of claim 1, wherein the assessed noise variance is derived by analyzing the content characteristics of the reference patch or the patch set to obtain analyzing result.

5. The method of claim 4, wherein the assessed noise variance is mapped to the analyzing result of the content characteristics linearly or non-linearly.

6. The method of claim 4, wherein the content characteristics of the patch set corresponds to pixels in or near each patch of the patch set.

7. The method of claim 4, wherein the content characteristics of the patch set corresponds to at least one of contrast, lightness, saturation and hue.

8. The method of claim 4, wherein the content characteristics of the patch set corresponds to a frequency band.

9. The method of claim 1, wherein the reference patch is in YUV domain or Bayer pattern domain.

10. The method of claim 1, wherein said transforming the patch set is performed by three-dimensional transform, two-dimensional transform or one-dimensional transform.

11. The method of claim 10, wherein the three-dimensional transform corresponds to two-dimensional discrete cosine transform and one-dimensional Hadamard transform.

12. The method of claim 1, wherein said noise reduction is performed by modifying one or more frequency coefficients of the patch set according to the assessed noise variance.

13. The method of claim 1, wherein said noise reduction is performed by hard-thresholding or Wiener filtering.

14. The method of claim 1, further comprising aggregating all processed reference patches of the noisy image.

15. An image noise reduction method, the method comprising:
   receiving a noisy image with a first size;
   selecting one reference patch with a second size from the noisy image, wherein the second size is smaller than the first size;
   transforming the reference patch from spatial domain into frequency domain to obtain frequency coefficients of the reference patch;
   determining assessed noise variance of the reference patch according to at least one of the frequency coefficients, wherein the assessed noise variance is derived based on noise variance associated with the reference patch or based on content characteristics of the reference patch;
   modifying said at least one of the frequency coefficients for noise reduction according to the assessed noise variance; and
   inverse transforming the reference patch back to spatial domain to obtain one processed reference patch of the noisy image.

16. The method of claim 15, wherein the reference patch is in YUV domain or Bayer pattern domain.

17. The method of claim 15, wherein said transforming is performed by three-dimensional transform, two-dimensional transform or one-dimensional transform.

18. The method of claim 17, wherein the three-dimensional transform corresponds to two-dimensional discrete cosine transform and one-dimensional Hadamard transform.

19. The method of claim 15, further comprising applying aggregation on the processed reference patch.

20. The method of claim 15, wherein the assessed noise variance is used for noise reduction on similar patches of the reference patch.

21. An apparatus of reducing noise of noisy images, the apparatus comprising one or more electronic circuits, wherein said one or more electronic circuits are configured to:
   receive a noisy image with a first size;
   select one reference patch with a second size from the noisy image, wherein the second size is smaller than the first size;
   determine assessed noise variance for the reference patch associated with a patch set, wherein the patch set consists of the reference patch, similar patches exhibiting high similarity to the reference patch, or both the reference patch and the similar patches, and wherein the assessed noise variance is derived based on noise variance associated with the patch set or based on content characteristics of the patch set;
   identify said similar patches and group said similar patches with the reference patch into the patch set;
   transform the patch set into frequency domain;
   apply noise reduction to the patch set in the frequency domain according to the assessed noise variance of the reference patch;

inverse transform the patch set back to spatial domain to obtain one processed reference patch of the noisy image; and aggregate all processed reference patches of the noisy image.

22. An apparatus of reducing noise of noisy image, the apparatus comprising one or more electronic circuits, wherein said one or more electronic circuits are configured to:

receive a noisy image with a first size;

select one reference patch with a second size from the noisy image, wherein the second size is smaller than the first size;

transform the reference patch into frequency coefficients;

determine assessed noise variance for the reference patch according to at least one of the frequency coefficients, wherein the assessed noise variance is derived based on noise variance associated with the reference patch or based on content characteristics of the reference patch;

modify said at least one of the frequency coefficients for noise reduction according to the assessed noise variance;

inverse transform the reference patch back to spatial domain; and apply aggregation on one processed reference patch.

* * * * *